Figure 1:
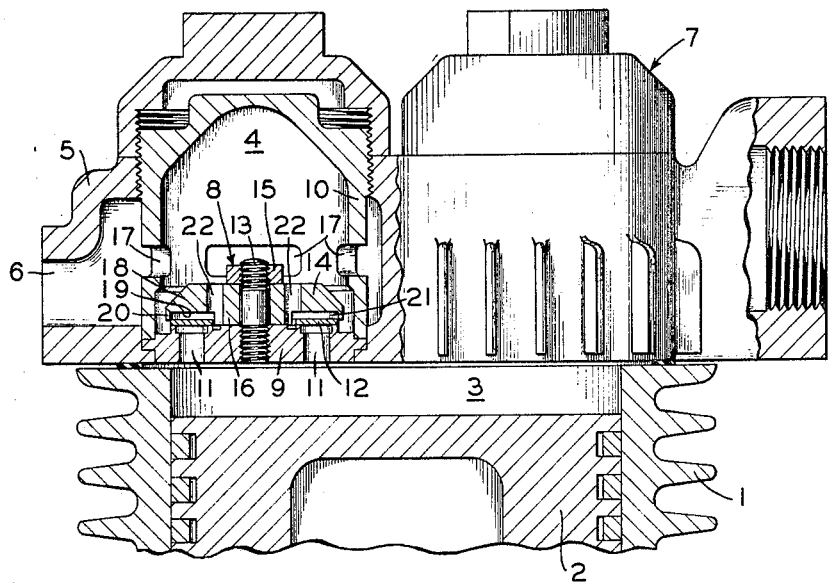

Oct. 25, 1966     F. W. SHIREY     3,280,840

COMPRESSOR DISCHARGE VALVE ASSEMBLY WITH AIR SPRING

Filed July 23, 1963

INVENTOR.
FRANK W. SHIREY

BY *A. A. Steinmiller*

ATTORNEY

United States Patent Office 3,280,840
Patented Oct. 25, 1966

3,280,840
COMPRESSOR DISCHARGE VALVE ASSEMBLY WITH AIR SPRING
Frank W. Shirey, Irwin, Pa., assignor to Westinghouse Air Brake Company, Wilmerding, Pa., a corporation of Pennsylvania
Filed July 23, 1963, Ser. No. 297,057
1 Claim. (Cl. 137—514.3)

This invention relates to air compressor valves and, more particularly, to an air compressor discharge valve utilizing an air cushion for cushioning the valve when it is unseated and for baising the valve toward its seated position.

As is well known, the discharge valve of air or fluid compressors is usually provided with a spring such as the helical type which serves to reseat the valve upon completion of the compression stroke of the piston. Due to its location over the discharge valve, this biasing spring, in operation, is subjected to very severe punishment such such as a high degree of heat developed in the compressor and acute shock action of the valve against the spring both during unseating and reseating of the valve.

Operating conditions such as those immediately above described demand use of a spring of very high quality and, therefore, costly to produce, and, even so, due to the adverse conditions under which the springs must operate, it is necessary to frequently replace broken or fatigued springs. Moreover, part of the compression forces or output developed by the compressor is expended in overcoming the resistance of the spring during discharge of compressed air from the compression chamber. This loss in output can be compensated for, if desired, by increasing the input or driving power, in which case the operating temperature of the compressor is accordingly raised as is the cost of operation. It has also been observed that, due to vibrations within the compressor, the biasing spring does not necessarily maintain constant biasing contact with the valve member, that is, the two are frequently separated then come together again with severe shock which further helps to shorten the life of the spring.

It is the principal object of this invention, therefore, to provide an improved discharge valve arrangement for fluid compressors in which the biasing spring normally employed in such a valve for cushioning the valve when it is unseated during the compression stroke and for reseating it upon completion of the compression stroke, is eliminated. The valve assembly is so arranged as to make use of an air cushion formed therein, when the valve is unseated by the compression stroke of the piston, for cushioning the valve during unseating thereof and for biasing it promptly to its seated position upon completion of the compression stroke. The invention, very briefly, comprises a washer type disc valve operably disposed between a fixed valve retainer member having a complementary annular flat surface, against which the disc valve moves during the compression stroke of the piston, and an annular valve seat member surrounding the opening between the compression chamber and the discharge chamber, so that, as the valve is unseated by the compressed air flowing from the compression chamber, it is rapidly displaced from the valve seat toward the flat surface of the retainer member. As is well known, when two flat objects or surfaces are rapidly moved toward each other, the air therebetween is momentarily trapped to thus act as a cushion and thereby prevent the objects from slamming against each other. This phenomenon is utilized in the present invention by providing the washer type disc valve with a radially disposed annular plane surface oppositely facing a radially disposed annular plane surface formed on the valve retainer member and against which the disc valve is moved at a rapid rate when unseated during the compression stroke. Since the invention is intended to be used in high speed compressors operating at 800 r.p.m. to 1,200 r.p.m., for example, the disc valve, for each operating cycle of the piston, is in its unseated position for such a small fraction of a second during the compression stroke of the piston that the air cushion trapped between the disc valve and the retainer member does not have time enough to be dissipated before the piston commences its intake stroke, and, therefore, the air cushion acts as a biasing force to immediately cause said valve to be reseated with a minimum loss of time.

Figure 2:
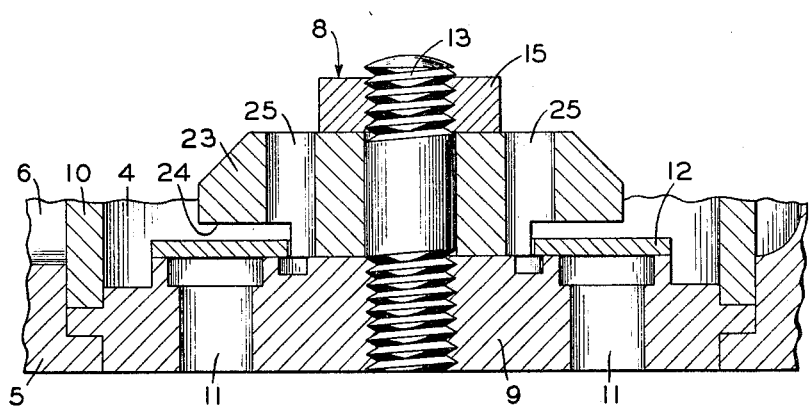

In the drawing, FIG. 1, mostly in section, shows a portion of a fluid compressor including a cylinder head showing therein one form of a discharge valve assemblage embodying the invention, and FIG. 2 is a fragmentary portion of FIG. 1 on a larger scale, showing a modified version of a discharge valve assemblage.

*Description and operation*

For purposes of illustrating the invention, a portion of a fluid compressor cylinder 1 is shown with a portion of a piston 2 reciprocably operable therein for compressing fluid in a compression chamber 3. The compressed fluid is discharged into a discharge chamber 4 formed in a cylinder head 5 of the compressor whence it is delivered by way of a delivery port or outlet 6 to a storage reservoir (not shown). The portion of the compressor shown in FIG. 1 of the drawing also comprises an intake valve portion 7, the details of which are not considered pertinent to an understanding of the invention and, therefore, have not been shown.

The portion of the compressor shown in FIG. 1 further comprises a discharge valve assemblage 8 interposed between the compression chamber 3 and the discharge chamber 4. The discharge valve assemblage 8 comprises a valve seat member 9 secured in the cylinder head 5 by a hollow screw-threaded plug 10 in which the discharge chamber 4 is formed. The valve seat member 9 is provided with a plurality of openings 11, via which compression chamber 3 may communicate with discharge chamber 4, said openings extending axially through said valve seat member and being disposed in a circular pattern adjacent the outer periphery thereof. A washer type disc or discharge valve 12 having a central opening therein is adapted, when in a seated position over the openings 11, for cutting off communication between compression chamber 3 and discharge chamber 4. A screw-threaded stud 13 is coaxially secured in the valve seat member 9 for receiving a valve retaining member 14, which is coaxially secured thereon by a nut 15, said valve retaining member having a relatively short coaxially disposed stem portion 16 which abuts against the valve seat member and on which the central opening of the disc valve 12 is guided for free axial movement of the valve. The stem portion 16 is of prescribed length to thereby determine the amount of axial movement of disc valve 12 from its seated position, above defined, to an unseated position in which compression chamber 3 is placed in communication with discharge chamber 4 via the openings 11 in the valve seat member 9, said discharge chamber being open to the delivery port 6 by way of a plurality of openings 17 formed in the plug 10.

The valve retaining member 14 has formed thereon a radially extending flange 18 which has a plane annular surface 19 oppositely facing the disc valve 12 and toward which said disc valve moves when moving from its unseated position. The axial distance of the surface 19 from the valve seat member 9 is equal to the axial length of the stem portion 16 of the retaining member 14, said axial distance less the axial thickness of the disc valve 12 thereby determining the dimension of the air space in which axial movement of the disc valve between its seated and unseated position may occur. From tests and service experience, it has been found that an air space of approximately .045 inch to .059 inch provides satisfactory performance, from a power input and volumetric efficiency standpoint, closely comparable to heretofore standard valve devices employing springs. A peripheral skirt 20 extending axially toward the valve seat member 9 is formed on and surrounds the flange 18 of the valve retaining member 14 so as to form an annular recess 21 surrounding the stem portion 16. The radial distance of the recess 21 between the stem portion 16 and the skirt 20 is such as to permit the disc valve 12 to move freely into said recess when operated from its seated position to its unseated position, yet being effective for causing the air between the respective flat surfaces of the disc valve retaining member 14 to be momentarily trapped to provide an air cushion for a purpose to be hereinafter disclosed. When disc valve 12 is in its unseated position, compressed air or fluid may flow from compression chamber 3, through openings 11 and past the outer periphery of the valve retaining member 14 and also through a plurality of axially disposed openings 22 formed in the valve retaining member 14, said openings 22 being arranged in circular fashion adjacent the inner periphery of the annular recess 21 with each having one end opening thereinto and the other end opening into the discharge chamber 4.

During operation of the compressor, the piston 2, in well known manner, moves through its intake stroke (in a downward direction, as viewed in the drawing) to cause air to be taken into the compression chamber 3 via the intake valve (not shown) in the intake valve portion 7 and, upon completion of the intake stroke, said piston moves upwardly through its compression stroke to compress the volume of air taken into the compression chamber. Of course, immediately upon commencement of and during the compression stroke of piston 2, the intake valve is closed and remains so, whereas the discharge valve 12 is moved from its seated position on the seat member 9 into the recess 21 and toward the surface 19 of the valve retaining member 14 immediately upon preponderance of fluid pressure acting on the lower or compression side of said discharge valve, as viewed in the drawing, over fluid pressure acting on the upper or discharge side thereof, as effected by said piston during the compression stroke.

As was noted above, the discharge valve assemblage disclosed herein is intended to be used primarily with high speed compressors operating at such speeds as 800 r.p.m. to 1,200 r.p.m. Thus, the time lapsed for each operating cycle of the piston 2 is on the order of .075 to .05 of a second, the duration of the compression stroke being one-half of said time interval or approximately .037 to .025 of a second, depending on the operating speed of the compressor. Due to the rapidity, therefore, at which the discharge valve 12 is moved toward the flat surface 19 during the compression stroke and due to the short axial distance through which said discharge valve moves from its seated to its unseated position, as above defined, the air between said valve and said flat surface is momentarily trapped to thus form an air cushion and thereby prevent slamming of said discharge valve against said flat surface of the valve retaining member 14. Because of the very short duration of the compression stroke of the piston 2, as above noted, there is insufficient time for the air cushion formed between the valve 12 and the flat surface 19 to be dissipated before completion of said compression stroke, therefore, said air cushion remains effective for providing a biasing action on the valve for initiating rapid movement thereof toward its seated position as the piston starts on its intake stroke. Thus, as compared with a valve biased by a metal spring, which may momentarily lose contact with the valve, as above noted, the air cushion is effective for maintaining constant pressure on valve 12 during the entire time of the compression stroke and the initial part of the compression stroke.

The version of the invention shown in FIG. 2 of the drawing differs from that shown in FIG. 1 only in the respect that the discharge valve assemblage 8 is provided with a valve retaining member 23 which does not have a surrounding skirt about its outer periphery such as the skirt 20 on the valve retaining member 14 shown in FIG. 1. The valve retaining member 23 shown in FIG. 2 is provided, however, with a radially extending flat surface 24 toward which the valve 12 is displaced during the compression stroke of the piston 2. A plurality of axially disposed openings 25 arranged in a manner similar to the openings 22 in the valve retaining member 14 are also formed in the valve retaining member 23 for a similar purpose.

Although the absence of a surrounding skirt around the outer periphery of the valve retaining member 23 does reduce the air cushioning effect to some degree between the disc valve 12 and the surface 24 of the valve retaining member 23 in that there is no recess wherein the air may be trapped such as the recess 21 in the arrangement shown in FIG. 1, such reduction of the air cushioning effect is practically negligible so that the operating efficiency of the valve arrangement shown in FIG. 2 is not affected to any appreciable extent. The air cushioning effect is still obtained, when the flat surface of the disc valve 12 is moved rapidly at the rates above discussed toward the flat surface 24, as is the biasing action for restoring the valve immediately and positively to its seated position on the valve seat member 9.

The embodiment of the invention shown in FIG. 2 would be preferred for use in a location such as an industrial plant, for example, in which the atmosphere may contain much dust and other foreign matter which could combine with the lubricating oil of the air compressor when taken in through the intake valve and accumulate in the recess 21 of the arrangement shown in FIG. 1 when discharged from the compression chamber 3 into the discharge chamber 4. By eliminating the skirt around the valve retaining member 23 of the arrangement shown in FIG. 2, there is no recess or pocket in which such foreign matter could accumulate.

Having now described the invention, what I claim as new and desire to secure by Letters Patent, is:

A compressor discharge valve assembly comprising in combination:

(a) a valve seat member having an annular plane surface to which a plurality of ports formed in said valve seat member open to provide for discharge of air compressed in the compressor cylinder, (b) a valve retaining member removably secured at its central portion to the central area of the valve seat member surrounded by said ports, said valve retaining member having an annular plane surface paralleling said plane surface of the valve seat member in oppositely facing and axially spaced relation thereto, and (c) an annular disc valve guidably supported on the central portion of said valve retaining member between the respective annular plane surfaces of said valve seat member and said valve retaining member in a manner to open and close said ports as the valve is axially shifted responsively to variation of the pressure in the compressor cylinder, (d) the axial thickness of said annular disc valve, as related to the axial spacing between said annular plane surfaces, being such as to provide a restricted air space between said disc valve and the annular plane surface of the valve retaining member within a range of approximately .045 inch to .059 inch, said air space acting as a cushion for the valve as well as a constantly exerted biasing force to restore the valve to a seated position in which said ports on the valve seat member are closed.

References Cited by the Examiner
UNITED STATES PATENTS

| | | | |
|---|---|---|---|
| 908,413 | 12/1908 | Lotz | 137—514.3 |
| 1,650,494 | 11/1927 | Dally et al. | 137—454.4 X |
| 1,846,753 | 2/1932 | Rayfield | 137—454.4 |
| 2,599,898 | 6/1952 | Dalrymple | 137—454.4 |

WILLIAM F. O'DEA, *Primary Examiner.*

ISADOR WEIL, *Examiner.*

D. MATTHEWS, *Assistant Examiner.*